June 1, 1965    G. D. WINSTEAD    3,186,754
CAMP HOUSE FOR USE ON PICKUP TRUCKS AND THE LIKE
Filed Nov. 14, 1962    3 Sheets-Sheet 1
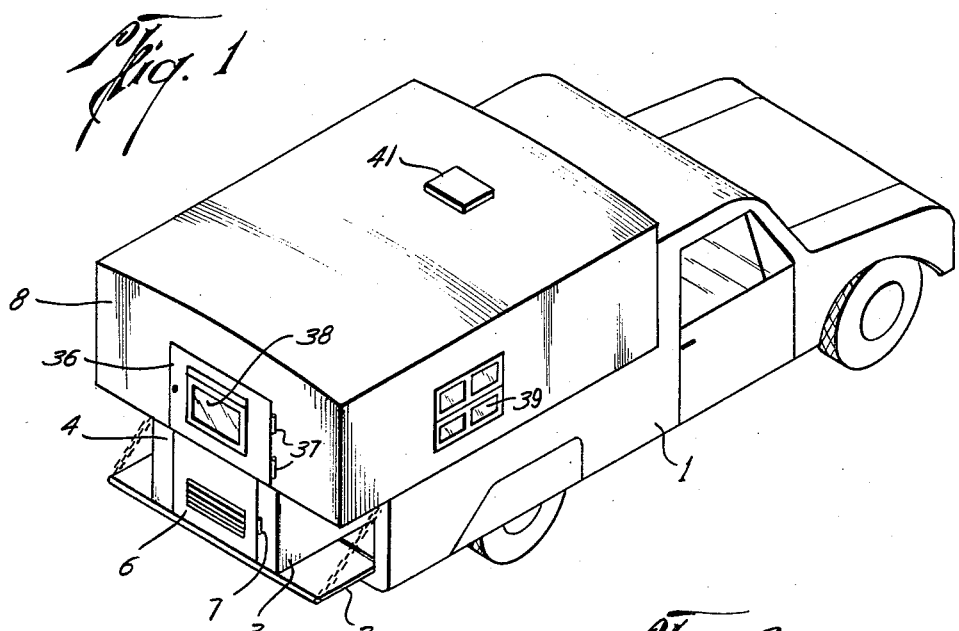
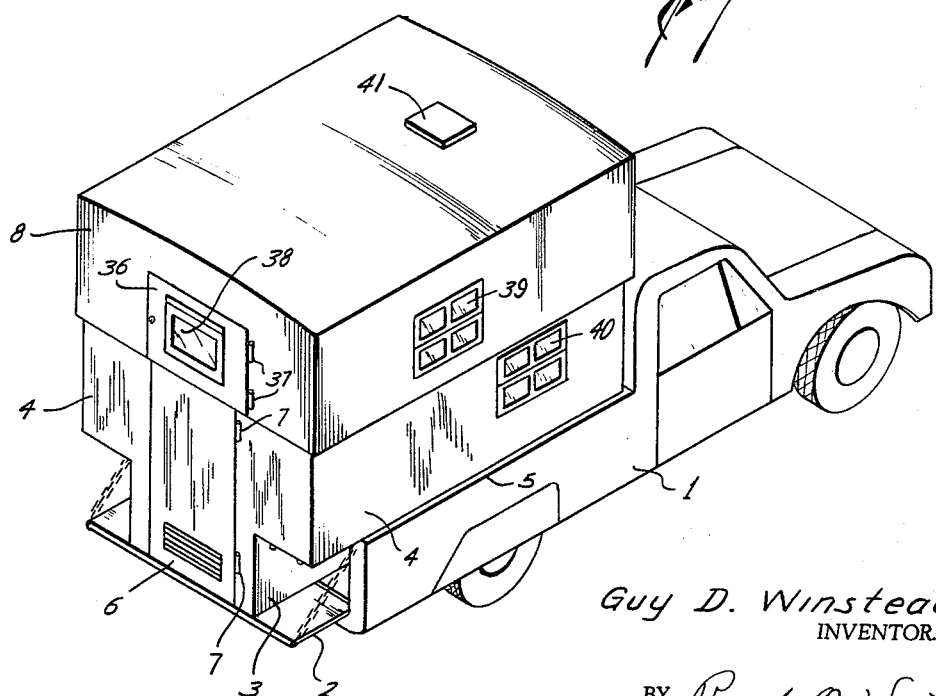
Guy D. Winstead
INVENTOR.
BY
ATTORNEY

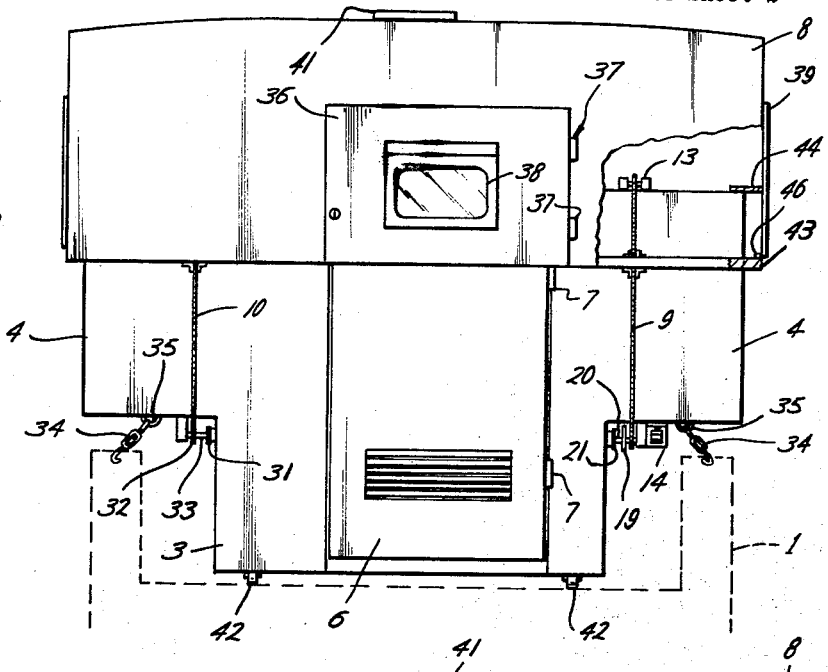
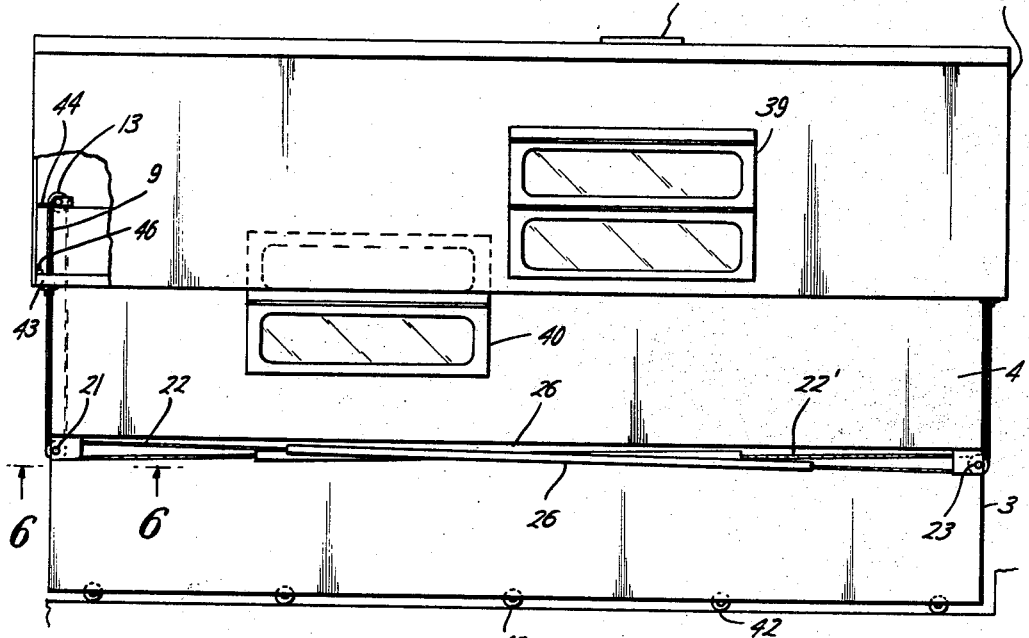

June 1, 1965  G. D. WINSTEAD  3,186,754
CAMP HOUSE FOR USE ON PICKUP TRUCKS AND THE LIKE
Filed Nov. 14, 1962                                       3 Sheets-Sheet 3

Guy D. Winstead
INVENTOR.

BY *Pamela O. Wyatt*
ATTORNEY

United States Patent Office 3,186,754
Patented June 1, 1965

3,186,754
CAMP HOUSE FOR USE ON PICKUP TRUCKS AND THE LIKE
Guy D. Winstead, 917 Airline Drive, Corpus Christi, Tex.
Filed Nov. 14, 1962, Ser. No. 237,596
1 Claim. (Cl. 296—23)

This invention relates to new and useful improvements in a collapsible camp house for use on a pickup truck or trailer.

It is an object of this invention to provide a camp house that may be readily installed on the bed of a pickup truck, or a trailer, and easily transported when in collapsed position, and readily movable into expanded position for use.

It is another object of the invention to provide a camp house having two telescoping sections and having novel means for elevating and lowering one section for movement of the sections into compact relation for transport when in one position and for living quarters when in another position.

It is another object of the invention to provide a camp house having novel means for moving same on and off a truck or trailer bed.

With the above and other objects in view, the invention has relation to certain novel features of construction, operation and arrangement of parts more particularly defined in the following specifications and illustrated in the accompanying drawings, wherein:

FIGURE 1 is a perspective view of the camp house mounted on a pickup truck and in transport position.

FIGURE 2 is a perspective view of the camp house mounted on a pickup truck and in position for use as living quarters.

FIGURE 3 is an end elevational view of the camp house mounted on a pickup truck, showing one end wall partially broken away to illustrate the elevating mechanism employed.

FIGURE 4 is a side elevational view of the camp house, showing one side wall partially broken away to illustrate the elevating mechanism employed.

Figure 5:
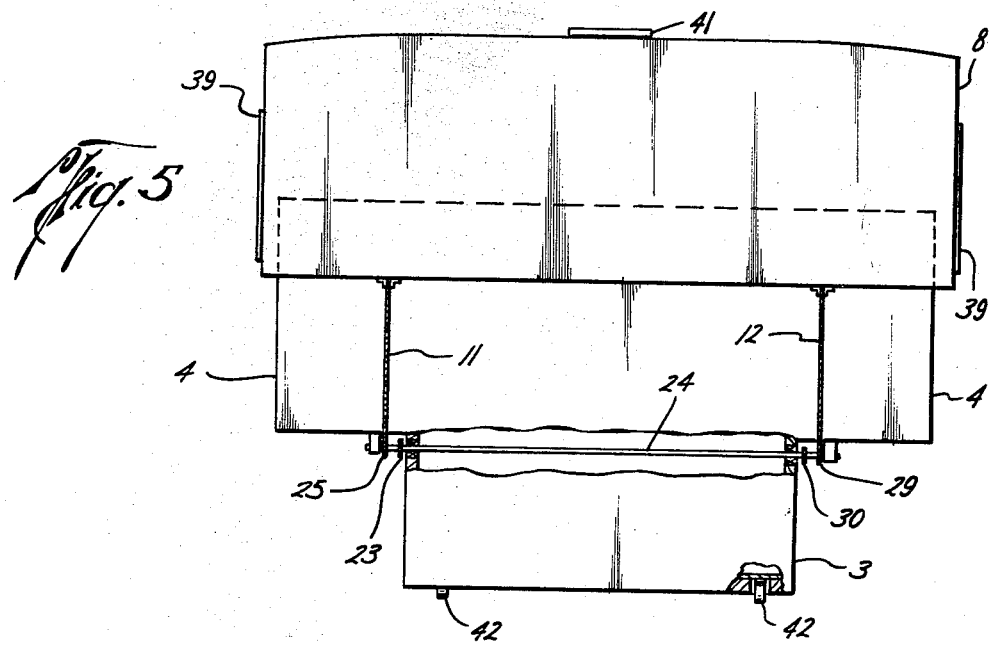
FIGURE 5 is an end view of the other end of the camp house, showing parts of the end wall of one section broken away to illustrate the elevating mechanism employed and the means employed for assisting in loading and unloading.
Figure 6:
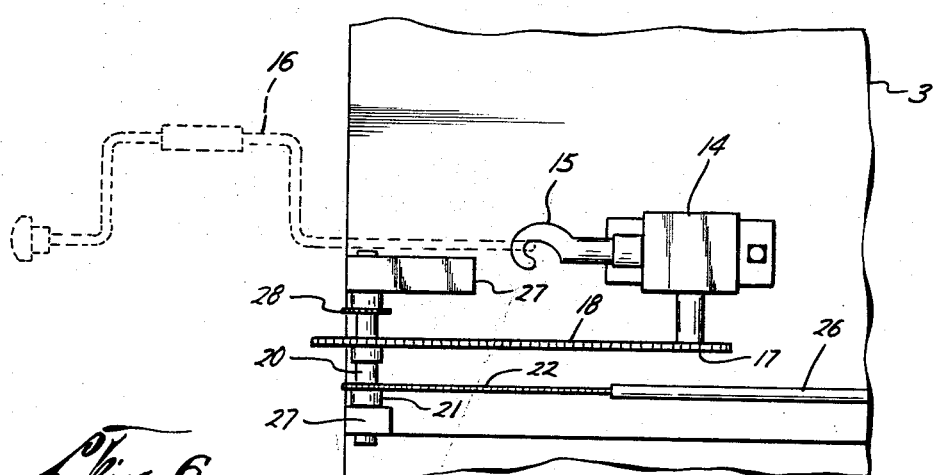
FIGURE 6 is a bottom view, taken on the line 6—6 of FIGURE 4, illustrating the elevating means employed.

Referring now more particularly to the drawings, the numeral 1 designates a pickup truck having a tail gate 2. The lower section 3 of the camp house has the outwardly flared sides 4, 4 which extend over the top margins as 5 of the pickup bed. An outwardly opening door 6 is mounted in the rear end of the lower section 3 and is provided with suitable hinges 7, 7 which are counter sunk into the door and wall of the section 3. The upper section 8 telescopes over the lower section 3 and is suspended thereon by means of the link chains 9, 10, 11 and 12, each chain being anchored at one end to the outside margin of the section 8 and at the other end to the inside margin of the section 8, and each chain extending over a toothed sprocket as 13 mounted on the upper end margin of the lower section.

The elevating mechanism consists of the self-locking worm gear power transmission unit 14, of conventional construction, which is mounted on the lower section 3 having the rotating arm 15 which may be manually rotated by means of a suitable crank as 16. The shaft 20 is mounted in suitable bearing blocks 27, 27 on the lower section 3. A large sprocket 19 is mounted on the shaft 20 and the sprocket 17, mounted on the drive shaft of the power transmission unit 14, rotates the chain 18, connecting the sprockets 17, 19, respectively, the relative sizes of the said two sprockets 17, 19 being as desired to provide the ratio of rotation suitable to the load, the desired ratio being a sixteen tooth sprocket 17 and a twenty tooth sprocket 19 on the average size house. The sprocket 28 mounted on the shaft 20 actuates the chain 9 and another sprocket as 21 is mounted on the shaft 20 and actuates the chain 22 which has its respective ends connected to the straps 26, 26. The straps 26, 26 extend lengthwise of the section 3 and the respective ends of the chain 22′ are connected to the other ends of the straps 26, 26 and the chain 22′ travels over and rotates the sprocket 23, which is fixedly mounted on the shaft 24 on which the sprockets 29 and 25 are mounted, the chains 12, 11 being actuated by said sprockets 29, 25.

A sprocket 30 actuates a similar set of chains and straps on the other side of the section 3, to rotate the sprocket 31 and impart rotation to the sprocket 32 through the shaft 33 to actuate the chain 10.

Suitable anchoring means may be provided, such as the usual chains and turnbuckles 34, 34 secured to the vehicle at one end and having hooks at the other ends mountable in the eye-bolts 35, 35 mounted in the bottom of the lower section 3.

The upper section 8 is provided with the door 36 having spring loaded hinges 37, 37, the lower end of the door 36 overlapping the upper end of the door 6, so that the doors may be opened together or individually by opening the upper door first. The upper door is provided with a window 38. The windows 39, 40 mounted in the upper and lower sections respectively, are offset from each other when the sections are in lowered position so that the openings are blocked when the camp house is in transport position.

A suitable ventillating window as 41 is installed in the top of the upper section 8.

On the bottom of the lower section 3 are mounted suitable rollers 42, 42 to provide means for easy movement of the house into and out of the truck bed.

The bottom margin of the upper section 8 is inwardly turned, providing a flange 43 and an outwardly extended flange 44 is mounted on the upper end margin of the lower section 3. A continuous gasket of flexible material 46 is mounted on the flange 43 to bear against the flange 44 when the parts are in elevated position, thus sealing the joinder against draughts and insects. The top of the section 8 rides on the flange 44 when the top is in lowered position, providing a seal while in transport.

In use, the camp house may be quickly and easily loaded onto a pickup truck, or trailer, by means of the rollers 42, 42 and the upper section 8, in lowered position as shown in FIGURE 1, will provide a secure and compact load, anchored in place by the chains 34, 34 and being low enough relative to the truck to offer very little wind resistance, the windows 39, 40 having solid walls behind them and the doors 6, 36 similarly blocked, prevents access into the house while in lowered position. When it is desired to occupy the house, the unit 14 will provide easy means of elevating the upper section, through the sprocket and chain train, providing even lift to all four corners of the vehicle. The self-locking unit will permit the user to stop at any point in raising or lowering the upper section 8 with out danger of the upper section returning by gravity to lowered position. When the upper section 8 has been raised to its maximum, the gasket 46 will bear against the flange 44, thus sealing the two sections. When it is desired to again transport the camp house, the crank 16 may be again employed to lower the upper section 8 to the position shown in FIGURE 1.

While the lowering of the upper section is aided by gravity, the self-locking worm gear unit applies pressure to the lowering action to assure descent, as well as maintaining constant control of the lowering action.

While the foregoing is considered a preferred form of the invention, it is by way of illustration only, the broad principle of the invention being defined in the accompanying claim.

What I claim is:

In a camp house for use on pickup truck beds and the like, rectangular upper and lower telescoping sections, the lower section being shaped to fit in the bed of a pickup truck and having its side walls outwardly extended to extend over the side walls of a pickup truck bed, a sprocket on the upper end margin of the lower section adjacent each corner thereof, elevating chains, each anchored at one end to the inside lower margin of the upper section and extending over one of said sprockets and anchored at the other end to the outside lower margin of said upper section, a worm gear power transmission unit on said lower section, a drive shaft mounted on said lower section at one end and actuated by said power transmission unit, a sprocket on said drive shaft over which one of said elevating chains is mounted, another sprocket on said drive shaft, a chain mounted on said last mentioned sprocket, the respective ends of said chain being anchored to the one end of a pair of straps extending longitudinally along one side of said lower section, a rotatable shaft having sprockets mounted thereon at the other end of said lower section, a chain mounted on one of said last mentioned sprockets, the respective ends of said chain being anchored to the other end of said straps, sprockets on said rotatable shaft over which a chain is mounted having its respective ends anchored to one end of a pair of straps extending longitudinally on the other side of said lower section, a rotatable drive shaft on said lower section having a sprocket thereon, a chain having its respective ends mounted to the other ends of said straps and extending over said last mentioned sprocket, another sprocket on said last mentioned drive shaft on which one of said elevating chains is mounted and actuated thereby synchronizing the movement of all corners.

References Cited by the Examiner

UNITED STATES PATENTS

| | | | |
|---|---|---|---|
| 1,293,664 | 2/19 | Avery | 296—35 |
| 2,055,930 | 9/36 | Joseph | 296—23 |
| 2,749,174 | 6/56 | Medford | 296—23 X |
| 2,944,852 | 7/60 | Snyder | 296—23 |
| 3,000,664 | 9/61 | Martin | 296—23 |
| 3,021,170 | 2/62 | Cornelius | 296—23 |
| 3,053,563 | 9/62 | Green | 296—27 |

FOREIGN PATENTS 53,167    8/90    Germany.

MILTON BUCHLER, *Primary Examiner.*

A. HARRY LEVY, *Examiner.*